Patented Aug. 22, 1933

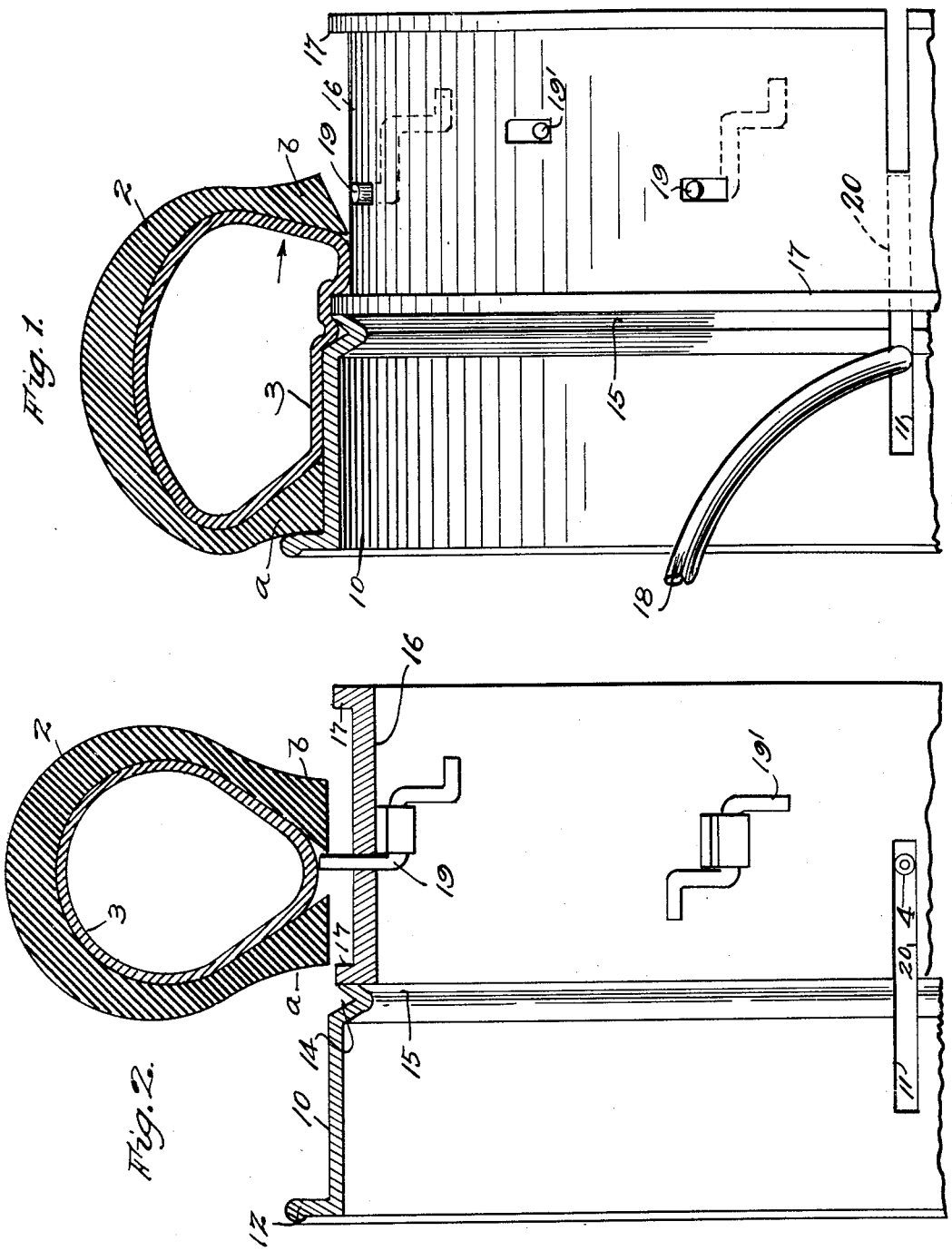

1,923,750

UNITED STATES PATENT OFFICE 1,923,750

PNEUMATIC TRUCK TIRE REMOVER

George A. Schmidt, Walnut Park, Calif.

Application November 29, 1932
Serial No. 644,798

4 Claims. (Cl. 157—6)

This invention relates to pneumatic tires of vehicles.

Considerable difficulty is encountered in the removal of pneumatic tires from their wheel rims, especially with the large size tires and with heavy duty tires of trucks.

The great inherent stiffness of these tires and their tendency to freeze to the rims after a little use necessitates great muscular exertion and abusive use of tools, sometimes with destructive effects.

It is an object of the present invention to provide a method and an apparatus which will greatly facilitate the removal of such tires; will substantially eliminate muscular effort in the performance; wholly overcome abusive tool practice, and require no skillful operative to effect the removal of the tire from its rim.

The invention consists of certain advancements in this art as set forth in the ensuing disclosure and having with the above, additional objects and advantages as hereinafter developed, and whose construction, combination and details of means, and the manner of operation will be made manifest in the description of the herewith illustrative embodiment; it being understood that modifications, variations and adaptations may be resorted to within the scope, principle and spirit of the invention as it is more directly claimed herebelow.

Figure 1 is a diagrammatic view partly in section showing the transfer of a tire from a rim to a dummy rim which is shown in top plan.

Figure 2 shows the completely transferred tire.

Briefly, the apparatus and method consists in providing a tire receiving, dummy ring adapted to be placed next to a conventional rim, from which the clincher ring has been removed, then removing the pneumatic tube valve core from the tube on and to be removed from the rim, then gradually inflating the tube in the carcass to effect lateral expansion of that side wall which is near the applied dummy rim. When expanded to the desired degree the carcass wall is then latched against normal or inherent retractive tendency and the air pressure is gradually lowered with the result that that side wall lying on the usual tire rim is compelled by the contractive forces in the carcass to creep across its rim and over wholly onto the nearby dummy on which the formerly expanded wall is being retained or latched. The valve core may now be placed in the valve again for normal function.

In the illustrated apparatus and method a carcass 2 has an inner tube 3 with the usual valve stem 4. Ordinarily, when a tire of this type is punctured the tube can be inflated by pumping in air faster than it will escape, and this fact enables the successful removal of the tire from its rim by the apparatus and means here first disclosed.

Such tire is shown as mounted on a complementary rim 10 which has its valve stem aperture 11 extended to one side of the rim so that the stem may shift sidewise, as later explained. The tire beads a—b are retained between a stationary flange 12 and a removable clincher ring (not shown) which interlocks in a groove 14 whose outer wall 15 is preferably of less diameter than that of the rim 10.

Against the groove side of the rim is laid or stood, as the case may require, what may be called a dummy rim comprising a wide band 16 with similar side flange 17 which are of less diameter than the rim 10 so that the tire beads a—b may creep laterally onto the band 16.

The valve core being removed from the stem 4 an air hose 18 is applied to the stem while the tire is in place on the rim 10 and the tire is gradually inflated; the tube puncture hole being dammed by a finger or plug if need be.

As the tire expands one wall a rests against the flange 12 of the rim 10 while the other wall b creeps out and onto the surface of the dummy band 16; this forming a support for the inner tube 3 as this is exposed by the spreading of the free wall b.

When the wall b has expanded to the desired degree it passes a set of latches 19 which are adapted to be set outward after the wall passes them (Figure 2).

The dummy band 16 has a lateral slot 20 to receive the stem 4 as this moves from the rim as shown in Fig. 2.

When the wall b has been engaged by the latches 19 then the air hose 18 is disconnected from the stem 4 and the air blows from tube due to the inherent contractive effort of the spread carcass structure, as well as to equalize with atmosphere.

As the pressure in the tube falls the wall a will spring from flange 12 and gradually creep over onto the band 16, where the wall b is latched, and assume the normal tire section, Figure 2, following which the latches are retracted and the tire removed at will.

To provide for use with different width types of tires a plurality of sets of latches as set 19 and set 19' are provided.

The dummy band is adapted for reversible use;

that is, either side can be set or laid against a coordinate tire rim.

The tube 3 is shown in Fig. 1 as being inflated to expand the carcass and spread the wall b to the latches 19 whilst Fig. 2 shows the deflated tube in the carcass in position wholly on the dummy rim 16. It is understood that the average puncture in the tube can be temporarily plugged in any manner to permit enough inflation for this operation.

What is claimed is:

1. Tire removing apparatus including means to form a bed for support of the inner tube of a tire as the tube is inflated to cause lateral expansion of one wall of the tire while the opposite wall is at rest on the flange of the rim, and means disposed between side edges of the face of the bed to retain the expanded wall in position during deflation of the tube; said supporting bed means having slot provision for lateral shift of the valve stem of the tube.

2. That method for the removal of a tire from its rim which consists of inflating the tube of the tire while one wall thereof is free to move laterally, supporting the tube exposed at the opening between the walls on a peripheral bed as the wall moves outward, retaining the expanded wall in a desired position and deflating the tube while said wall is so retained to permit the opposite wall to drag by inherent contractive effort of the tire carcass from the said rim.

3. Tire removing apparatus including a portable band complementary to a given size tire rim and tire, and having latch means to interlock within a wall of the tire as the wall passes over said means; said means being disposed intermediate the side edges of the band face.

4. Tire removing apparatus including a portable band complementary to a given size tire rim and tire, and having means to interlock within a wall of the tire as the wall passes over said means; said band being reversibly applicable to the rim for tire shift.

GEORGE A. SCHMIDT.